(12) United States Patent
Lin et al.

(10) Patent No.: US 6,392,596 B1
(45) Date of Patent: May 21, 2002

(54) SINGLE-PORT WEIGHTING SYSTEMS FOR GPS RECEPTION IN MULTIPLE-INTERFERENCE ENVIRONMENTS

(75) Inventors: Zhen Biao Lin; Jian-Jin Lin, both of West Hills; Seymour Robin, Woodland Hills, all of CA (US)

(73) Assignee: Sensor Systems, Inc., Chatsworth, CA (US)

( * ) Notice: Subject to any disclaimer, the term of this patent is extended or adjusted under 35 U.S.C. 154(b) by 0 days.

(21) Appl. No.: 09/671,023

(22) Filed: Sep. 26, 2000

Related U.S. Application Data (62) Division of application No. 09/347,627, filed on Jul. 2, 1999, now Pat. No. 6,166,690.

(51) Int. Cl.⁷ .................................................. G01S 3/16
(52) U.S. Cl. ........................ 342/378; 342/372; 342/383
(58) Field of Search ................................ 342/152, 372, 342/378, 383

(56) References Cited

U.S. PATENT DOCUMENTS

| | | | | |
|---|---|---|---|---|
| 3,806,924 A | * | 4/1974 | Applebaum | 343/7.7 |
| 4,263,617 A | * | 4/1981 | Chemin et al. | 358/186 |
| 4,338,605 A | * | 7/1982 | Mims | 343/100 LE |
| 4,931,977 A | | 6/1990 | Klemes | 364/581 |
| 5,019,793 A | * | 5/1991 | McNab | 333/156 |
| 5,033,110 A | * | 7/1991 | Harman | 455/114 |
| 5,068,668 A | * | 11/1991 | Tsuda et al. | 342/362 |
| 5,347,284 A | | 9/1994 | Volpi et al. | 342/352 |
| 5,471,220 A | | 11/1995 | Hammers | 342/372 |
| 5,530,927 A | * | 6/1996 | Smith | 455/317 |
| 5,694,416 A | | 12/1997 | Johnson | 375/206 |
| 5,712,641 A | | 1/1998 | Casabona et al. | 342/362 |
| 5,748,679 A | * | 5/1998 | Finkenbeiner et al. | 375/305 |
| 6,054,948 A | * | 4/2000 | Dean | 342/372 |

* cited by examiner

*Primary Examiner*—Dao Phan
(74) *Attorney, Agent, or Firm*—Koppel, Jacobs, Patrick & Heybl (57) ABSTRACT

Single-port weighting systems are shown for applying phase and/or amplitude weights to received signals. One system embodiment includes an array of antenna elements, a microwave power combiner, a plurality of microwave structures and a single microwave downconverter that is coupled to the power combiner and has a single output port for access to the received signals. Each of the microwave structures couple first and second signal paths between a respective one of the antenna elements and the power combiner, insert a phase shift in one of the first and second signal paths and insert first and second mixers respectively in the first and second signal paths wherein the mixers each have an input port for application of the weights.

7 Claims, 12 Drawing Sheets

SINGLE-PORT TECHNIQUE
FIG. 2

MULTI-PORT TECHNIQUE
FIG. 1 (PRIOR ART)

$$e_{11} = \rho_1 \Phi_1^T = \frac{1}{2.83} \begin{pmatrix} 1 & 1 & 0 & -1 & -1 & 0 \\ 1 & 1 & 0 & -1 & -1 & 0 \end{pmatrix}$$

$$e_{12} = \rho_2 \Phi_1^T = 4.89 \begin{pmatrix} 1 & -1 & -2 & -1 & 1 & 2 \\ 1 & -1 & -2 & -1 & 1 & 2 \end{pmatrix}$$

$$e_{21} = \rho_1 \Phi_2^T = \frac{1}{2.83} \begin{pmatrix} -1 & -1 & 0 & 1 & 1 & 0 \\ 1 & 1 & 0 & -1 & -1 & 0 \end{pmatrix}$$

$$e_{22} = \rho_2 \Phi_2^T = 0.204 \begin{pmatrix} -1 & 1 & 2 & 1 & -1 & -2 \\ 1 & -1 & -2 & -1 & 1 & 2 \end{pmatrix}$$

$$e_{13} = \rho_1 \Phi_3^T = \frac{1}{2.83} \begin{pmatrix} 1 & 1 & 0 & 1 & 1 & 0 \\ 1 & 1 & 0 & 1 & 1 & 0 \end{pmatrix}$$

$$e_{23} = \rho_2 \Phi_3^T = \frac{2}{2.83} \begin{pmatrix} -1 & -1 & 0 & -1 & -1 & 0 \\ 1 & 1 & 0 & 1 & 1 & 0 \end{pmatrix}$$

$$e_{14} = \rho_1 \Phi_4^T = 0.707 \begin{pmatrix} 0 & 0 & 0.707 & 0 & 0 & 0.707 \\ 0 & 0 & 0.707 & 0 & 0 & 0.707 \end{pmatrix}$$

$$e_{24} = \rho_2 \Phi_4^T = \frac{1}{2.83} \begin{pmatrix} 0 & 0 & -0.707 & 0 & 0 & -0.707 \\ 0 & 0 & 0.707 & 0 & 0 & 0.707 \end{pmatrix}$$

$$e_{15} = \rho_1 \Phi_5^T = 0.707 \begin{pmatrix} -0.453 & 0.453 & -0.046 & 0.36 & -0.36 & 0.406 \\ -0.453 & 0.453 & -0.046 & 0.36 & -0.36 & 0.406 \end{pmatrix}$$

$$e_{25} = \rho_2 \Phi_5^T = 0.707 \begin{pmatrix} 0.453 & -0.453 & 0.046 & -0.36 & 0.36 & -0.406 \\ -0.453 & 0.453 & -0.046 & 0.36 & -0.36 & 0.406 \end{pmatrix}$$

$$e_{16} = \rho_1 \Phi_6^T = 0.707 \begin{pmatrix} 0.46 & -0.46 & -0.038 & 0.536 & -0.536 & 0.038 \\ 0.46 & -0.46 & -0.038 & 0.536 & -0.536 & 0.038 \end{pmatrix}$$

$$e_{26} = \rho_2 \Phi_6^T = 0.707 \begin{pmatrix} -0.46 & 0.46 & 0.038 & -0.536 & 0.536 & -0.038 \\ 0.46 & -0.46 & -0.038 & 0.536 & -0.536 & 0.038 \end{pmatrix}$$

SINGLE-PORT WEIGHTING SYSTEMS FOR GPS RECEPTION IN MULTIPLE-INTERFERENCE ENVIRONMENTS

This is a divisional of U.S. patent application Ser. No. 09/347,627 filed Jul. 2, 1999, now U.S. Pat. No. 6,166,690 from which priority is claimed.

BACKGROUND OF THE INVENTION

1. Field of the Invention

The present invention relates generally to the Global Positioning System (GPS) and more particularly to GPS reception in an interference environment.

2. Description of the Related Art

Numerous guidance and navigation systems benefit from use of the GPS which provides a wealth of information such as latitude, longitude, height, velocity and the exact time. The GPS constellation contains 24 satellites which are distributed throughout 6 different orbits. GPS signals are at carrier frequencies L1 (1575.42 MHz) and L2 (1227.60 MHz) and use spread spectrum signals with 1.023 Mbps binary phase shift keying (BPSK) modulation for a "short" coarse/acquisition (C/A) code and 10.23 Mbps modulation for a "long" precision (P) code.

With right-hand circular polarization, each GPS satellite transmits the following three signals: the C/A code modulated on the L1 carrier frequency with a 1 millisecond repetition rate, the P code modulated on the L1 carrier with a weekly repetition period and the P code modulated on the L2 carrier with a weekly repetition period.

The GPS constellation's design insures that 6 to 11 satellites are in view from any point on the earth's surface at any given time. Because of the GPS signal design, two-dimensional and three-dimensional positions can be determined with the signals from just three and four satellites respectively. Accordingly, GPS receivers typically have the capability of automatically selecting three or four of the satellites in view based upon their received signal strength and Position Dilution of Precision (PDOP).

A number of undesirable interference sources (e.g., deliberate electronic countermeasures, RF electromagnetic pollution, clutter scatter returns and nature noise) can cause a GPS receiver to be ineffective or unreliable. Receiver failure is generally due to missing synchronization in the spread-spectrum Pseudo Random Noise (PRN) code.

Accordingly, adaptive antenna arrays have been proposed in which knowledge of each element's received signal is used to modify those signals with weights (e.g., phase weights) that generate a null in the interfering signal's direction.

Various adaptive array systems are based on gradient-based algorithms which estimate the antenna's output-power gradient. Because processed signals from each element of the array are typically required for gradient computation, these receiving systems are often said to use a "multiport technique". In order to compute gradient of power, or correlation or other performance, the signal from every element must be accessible in these systems, i.e., a separate receiving channel is required for every element in the antenna array. Multiport techniques therefore require a separate coherent receiver channel for each element in the antenna array.

Figure 1:
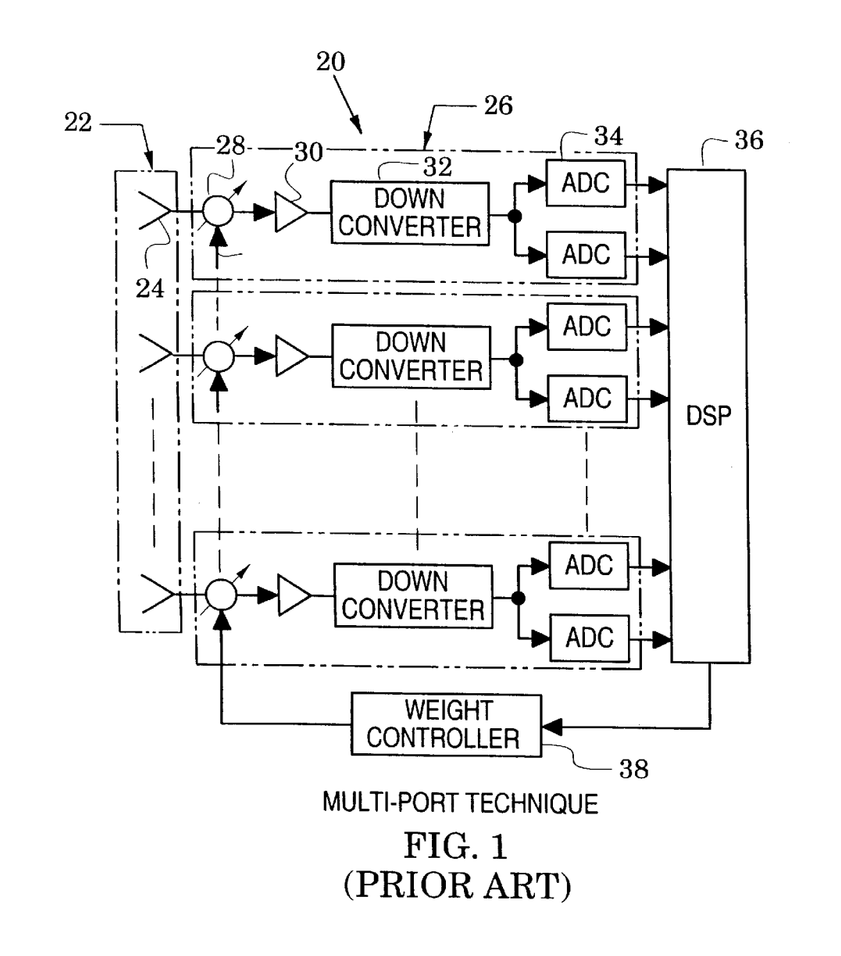
FIG. 1 is a block diagram of structure in a conventional "multiport technique" for receiving GPS signals in the presence of interference signals.

This is illustrated in FIG. 1 which shows an exemplary multiport structure 20 that has an array 22 of N antenna elements 24. Each element 24 feeds a different receiver channel 26 that includes an adjustable weighting element (e.g., a phase shifter) 28, a low noise amplifier 30, a down converter 32 for down converting the signal frequency from L band to baseband (or IF band) and a pair of analog-to-digital converters (ADC) 34 for partitioning the downconverted signal into I/Q components.

The digitized I/Q signals are coupled to a digital signal processor (DSP) 36 which performs optimal weight computations that require up to n(n+1) auto-correlation and cross-correlations and an n×n inverse matrix computation. A weight controller 38 then feeds the computed phase shifts back to the phase shifters 28.

An exemplary multiport technique is described in U.S. Pat. No. 5,694,416 (issued Dec. 2, 1997 to Russell K. Johnson) and another is shown in U.S. Pat. No. 5,471,220 (issued on Nov. 28, 1995 to David E. Hammers et al.) which illustrates a microwave packaging scheme that includes a coplanar section, fiber optical network, a plurality of adaptive beam processors, a fiber optical network, one or more signal processing modules and a set of microprocessors. In the coplanar section, a "sandwich style" package includes 3 layers: an antenna layer consisting of a plurality of elements, a transceiver layer consisting of a plurality of transceivers, and a beam forming layer.

U.S. Pat. No. 5,712,641 (issued on Jan. 27, 1998, to Mario M. Casabona et al.) describes an adaptive cross polarization interference cancellation system for GPS signals. It is based on dissimilarity between the right hand circular polarization of the GPS signal and the polarization of the interference signals. An orthogonally-polarized antenna system decomposes the received GPS signal into vertical-polarization and horizontal-polarization signals. Both are fed to an adaptive antenna feeding system which is controlled by an interference detection circuit and the resultant cross polarization attenuates the interference signals.

A reception technique which utilizes an analog to digital converter (ADC) prior to GPS signal processing is described in U.S. Pat. No. 5,347,284 (issued on Sep. 13, 1994, to John P. Volpi et al.). The ADC uses 4 level coding and full zone processing. A threshed detector senses the difference of a probability density function (PDF) in time distribution between the GPS signals' spread spectrum and continuous wave (CW) signals. For the CW signal, The PDF of the CW signal has a saddle shape (a falling off between two peak ending values) whereas that of the GPS signal is nearly uniform. Attenuating the digitized data in the vicinity of the peak ending values provides a degree of immunity to CW interference.

Although these conventional reception methods may improve reception of GPS signals in interference environments, they typically are hardware intensive (e.g., U.S. Pat. Nos. 5,694,416, 5,471,220 and 5,712,641) or limited to particular interference signals (e.g., U.S. Pat. No. 5,347,284).

SUMMARY OF THE INVENTION

The present invention is directed to methods for removing multiple interference signals from GPS signals without requiring:

a) complex gradient computations,
b) prior knowledge of interference-signal structure, or
c) an inordinate increase in software and hardware complexity as the number of interference signals increases.

These goals are achieved with adaptive nulling methods that combine orthogonal projection of sub-optimal weight vectors into an orthonormal weight base with an accelerated coefficient-searching process. Because they facilitate the use of single-output-port antennas and can be applied to any number of array elements, these methods reduce hardware complexity and system cost.

In particular, an optimal weight vector comprises the phases of array signals and is approximated by a linear combination of a set of orthonormal basis vectors and a corresponding set of coefficients. The coefficients are obtained by monitoring the single-output-port power while an intelligent controller controls the weights of all array elements simultaneously. In an exemplary embodiment, the orthonormal basis vectors are constructed from orthonormal radial and azimuth vector bases.

The methods do not require prior knowledge of interference-signal structures and, because of the uncoupled nature of the orthonormal basis vectors, they facilitate the simultaneous change of all phases so that the process rapidly converges to an optimal weight vector.

The novel features of the invention are set forth with particularity in the appended claims. The invention will be best understood from the following description when read in conjunction with the accompanying drawings.

BRIEF DESCRIPTION OF THE DRAWINGS

FIG. 13 recites orthonormal basis vectors for a circular antenna array that are the product of the orthonormal bases of FIGS. 12A and 12B;

DETAILED DESCRIPTION OF THE PREFERRED EMBODIMENTS

To further enhance an understanding of the invention's methods, it is instructive to precede a detailed disclosure of these methods with descriptions of receiving and antenna array structures that are particularly suited for practicing the methods.

Figure 2:
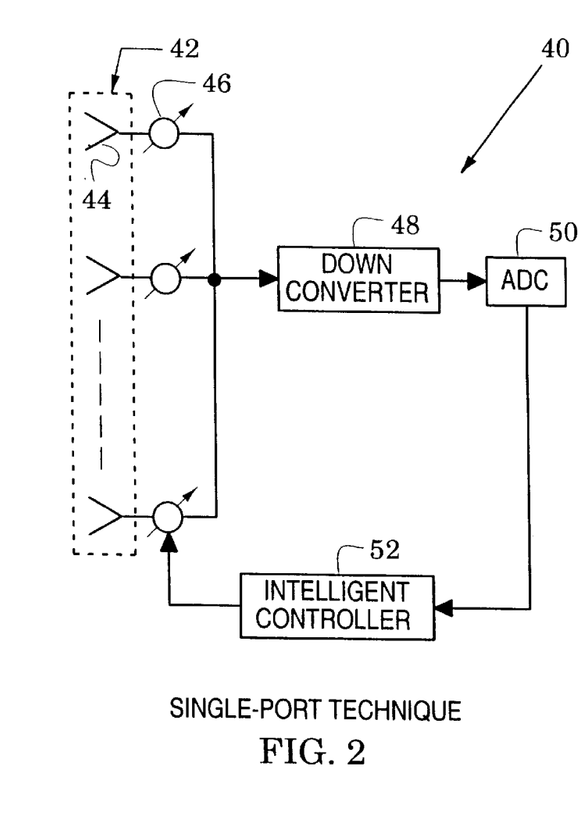
FIG. 2 is a block diagram of a single-port technique that is particularly suited for receiving GPS signals in the presence of interference signals with the methods of the present invention.

Accordingly, attention is first directed to the single-port technique of the present invention as exemplified by the structure 40 of FIG. 2 which has an array 42 of N antenna elements 44 followed by N weighting elements 46 (which add amplitude and/or phase weights). In contrast to the multiport structure of FIG. 1, the weighted signals are processed through a single downconverter channel 48 and sent to an analog-to-digital converter 50. The downconverted and digitized signals are then fed to an intelligent controller 52 that controls the weights so as to generate interference nulls in the array's receiving pattern.

Figure 3:
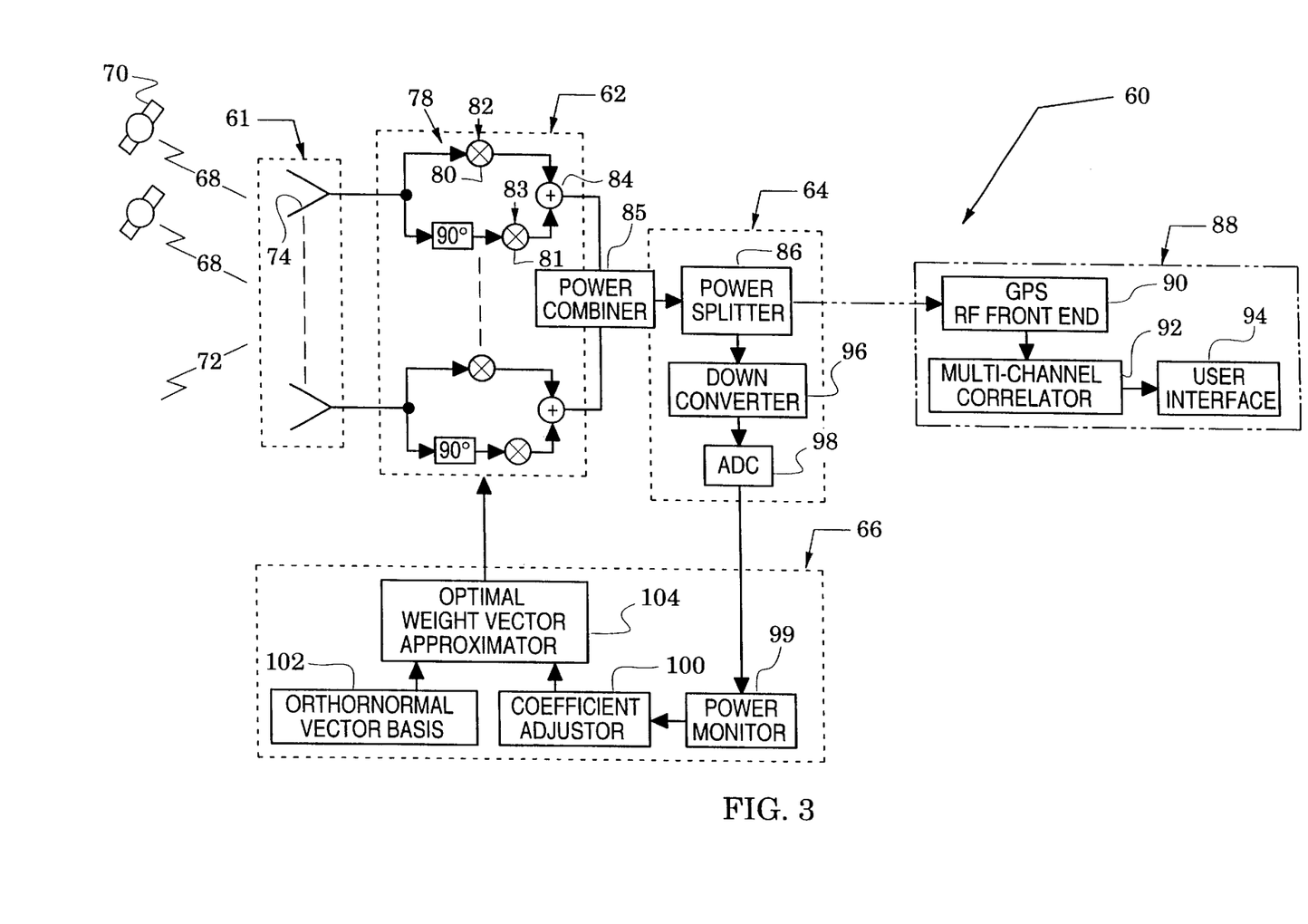
FIGS. 3 and 4 are block diagrams of exemplary realizations of the single-port technique of FIG. 2.

One detailed realization of the single-port structure of FIG. 2 is the receiving structure 60 of FIG. 3 which includes an antenna array 61, an I/Q weighting circuit 62, a single-port receiver 64 and an intelligent controller 66 (similar to the controller 48 of FIG. 2). GPS signals 68 from GPS satellites 70 and undesired interference signals 72 (e.g., from directional jamming sources) are received in elements 74 of the array 61.

The received signals are partitioned and phase-shifted 90° in a hybrid coupler 78 to form I and Q signal components. These components are fed through a parallel arrangement of first and second mixers 80 and 81 and combined in a summer 84.

When used to apply phase-only weights to the received signals, an analog signal $\cos\phi$ can be applied to an input 82 of the first mixer 80, a second analog signal formed to be $(1-(\cos\phi)^2)^{1/2}$ and the second analog signal applied to an input 83 of the second mixer 81. The structure of the weighting circuit 62 is accurate over a wide range of phases, is particularly suited for high-volume fabrication.

The signals into the first and second mixers 80 and 81 can be appropriately modified if it is desired to apply both amplitude and phase weights to the received signals. For the application of phase-only weights, other phase-shifting structures can be substituted for the weighting circuit 62 (e.g., structures that switch different-length signal paths).

An array RF power combiner 85 sums the N outputs of phase-shifted signals and the output of the array combiner is passed through a power splitter 86 to a conventional GPS receiver 88 which includes an RF front end 90, a multichannel correlator 92 and a user interface 94. A portion of the RF signals are diverted by the power splitter 86 to flow through a downconverter 96 and an ADC 98 to the intelligent controller 66.

In the intelligent controller 66, the digitized I/Q signals are processed through a power monitor 99. A coefficient adjuster 100 responds to the power monitor by generating coefficients which are combined with an orthornormal vector basis 102 in an optimal weight vector approximator 104. Weights determined by the approximator are then fed back to the I/Q weighting circuit 62.

The input to the intelligent controller 66 comes from the power-performance monitor 99 which processes the digitized data from the single downconverter channel 88. Conceptually, the intelligent controller 66 then approximates an optimal weight setting by, a) expressing a weight vector as a linear combination of orthonormal basis vectors and a set of coefficients, b) considering the array output power to be a measurable quantity that represents the "distance" between the applied weight setting and the optimal weight values (i.e., an efficient process for estimation of the orthogonal projection of the optimal weight is based on output power monitoring), and c) simultaneously updating all array weights.

Figure 4:
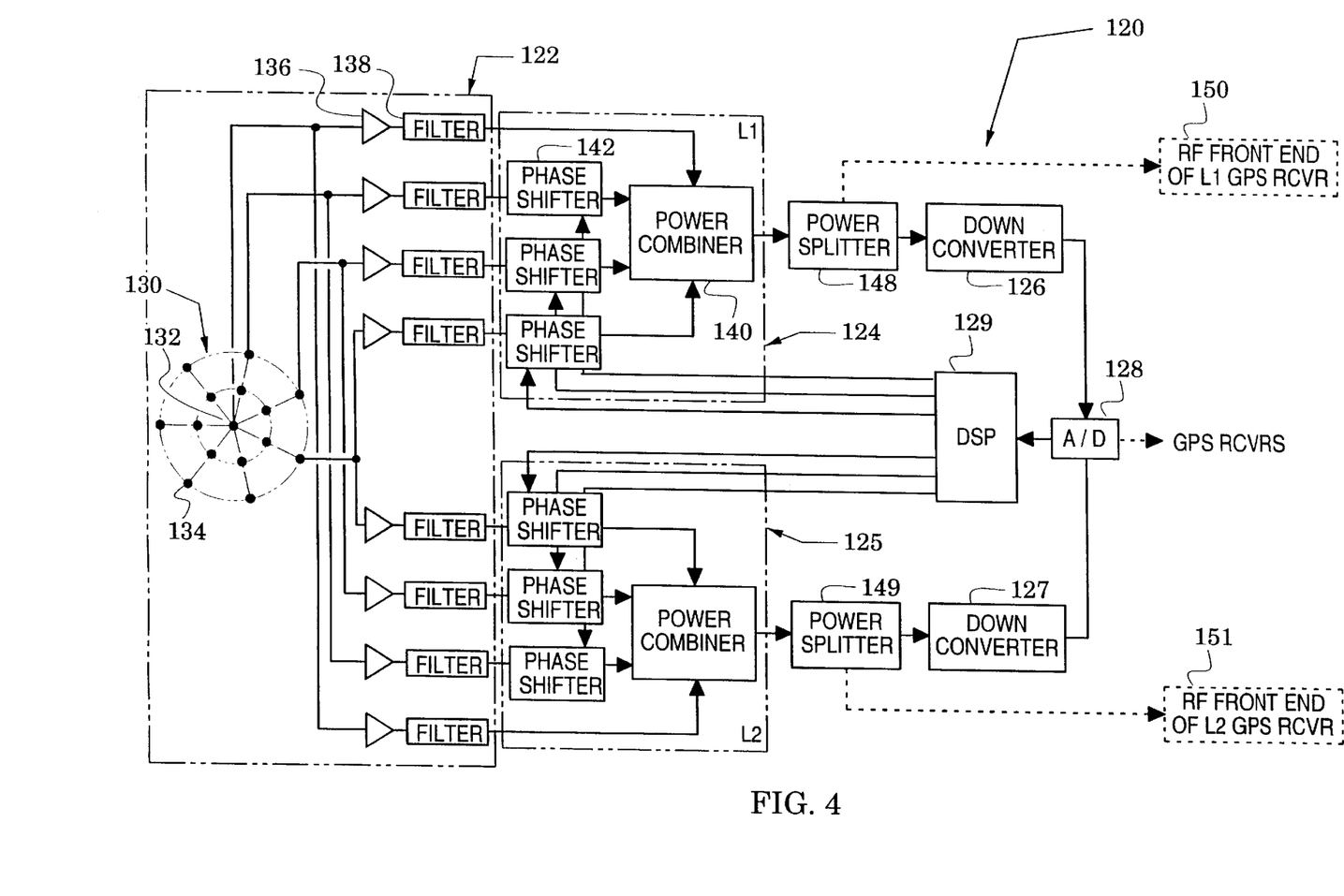

Another detailed realization of the single-port structure of FIG. 2 is the receiving structure 120 of FIG. 4. It has an antenna portion 122, L1 and L2 phase-shifter portions 124 and 125 and L1 and L2 downconverters 126 and 127. Baseband signals from the downconverters are digitized in a ADC 128 and processed in a DSP 129 which feeds back phase-shifter adjustment signals to the L1 and L2 phase-shifter portions 124 and 125.

The antenna portion 122 includes a circular array 130 that has a reference element 132 surrounded by auxiliary elements 134 whose positions can be defined in terms of their radial and azimuthal locations. A low noise amplifier 136 and L1 filter 138 (centered at 1575.42 MHz) couple the reference element 132 directly to a power combiner 140 in the L1 phase-shifter portion 124. The auxiliary elements 134 are coupled similarly to the power combiner but each of them also passes through a respective phase shifter 142.

Similar low noise amplifiers and filters couple the reference element 132 and auxiliary elements 134 in a similar manner to phase shifters and a power combiner in the L2 phase-shifter portion 125 except that the filters are centered about the L2 frequency of 1227.60 MHz.

The DSP 129 computes optimal phase-shift settings that minimize the output power (L1 and L2) via the orthogonal expansion methods of the invention. Power splitters 148 and 149 provide the combined L1 signal and the combined L2 signal at L band to the RF front ends 150 and 151 of conventional GPS L1 and L2 receivers for conversion to baseband. The digitized signals from the ADC 128 are also provided to the GPS receivers.

Figure 5:
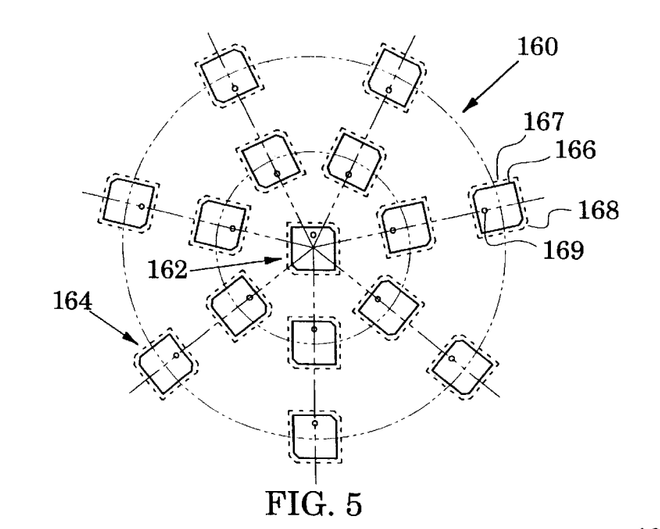
FIG. 5 is a plan view of an exemplary antenna array for use in the receiver systems of FIGS. 2, 3 and 4.

FIG. 5 shows another circular antenna array 160 that is similar to the array 130 of FIG. 4. It includes a centrally-positioned reference element 162 and fourteen auxiliary elements 164 distributed on two concentric circles. In particular, each of these elements is formed with stacked metallic patches 166 and 167 (for clarity of illustration, the lower patch is shown in broken lines) that are respectively sized for the GPS L1 and L2 signals. To generate and receive right-hand circularly-polarized GPS signals with a simple feed structure, the patches have a square configuration with truncated corners 168 and a single offset feed 169. Preferably, the patches are positioned over a high-dielectric-constant substrate (e.g., dielectric constant >20) to reduce their size.

Figure 6:
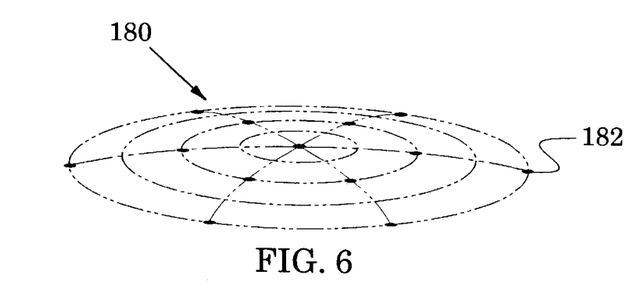
FIG. 6 is a perspective view of another exemplary antenna array for use on a nonplanar surface.
Figure 7:
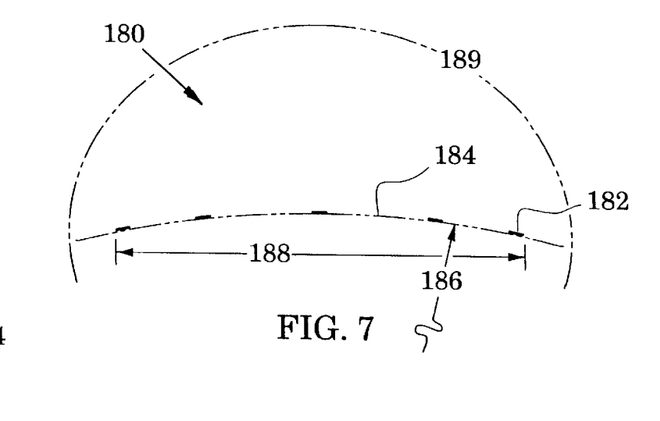
FIG. 7 is a side view of the array of FIG. 6.

It may be desirable to practice the invention's methods with antenna structures that conform to a nonplanar surface (e.g., the surface of an aircraft, missile, or mobile platform) in order to enhance aerodynamic performance or realize a smaller radar cross-section. Accordingly, FIG. 6 shows another exemplary antenna array 180 whose elements 182 are located similarly to those of the array 160 of FIG. 5 but which are also positioned to lie upon a nonplanar surface. FIG. 7 is a side view of the spherical array 180 of FIG. 6 and it illustrates that the elements 182 may lie on a spherical surface 184 whose radius of curvature 186 is preferably much greater than the array's aperture 188. The spherical configuration of the array 180 may be used to enhance the uniformity of its radiation pattern 189 over wide angular region.

Figure 8:
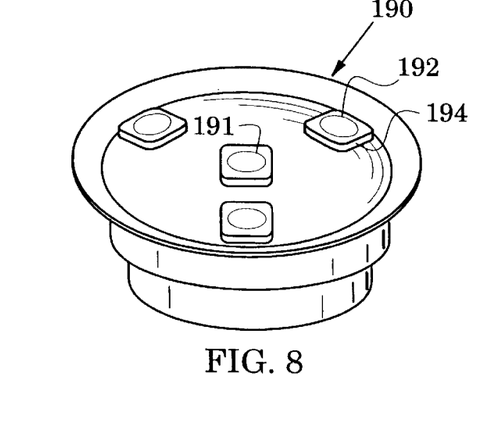
FIG. 8 is a perspective view of another exemplary antenna array for use in the receiver systems of FIGS. 2, 3 and 4.

FIG. 8 illustrates another circular antenna array 190 that has a reference element 191 and three auxiliary elements 192 that are each carried on a high-dielectric-constant substrate 194. Although not shown, each element is formed from stacked metallic patches (similar to those of FIG. 5) with upper and lower patches respectively operating at L1 (1575.42 MHz) and L2 (1227.6 MHz) frequencies. The patches can be fed in any of various conventional ways to generate and receive right-hand circularly-polarized GPS signals. For example, they can be fed at two points with 90° phase shift inserted between them. Although this type of feed will generally provide greater bandwidth than that shown in FIG. 5, it is somewhat more complex.

Having described several exemplary receiving and antenna array structures for practicing the invention's methods, attention is now directed to those methods.

The present invention recognizes that any signals above thermal noise in a GPS system can be considered to be from an interference source. This follows from the following considerations. Because thermal noise is given by $$N_o = KTB = 1.38 \times 290° \text{ K} \times B \qquad (1)$$

(in which ° K is degrees Kelvin and B is frequency bandwidth) and because the minimum requested bandwidth for the GPS C/A code is >0.88×1.023 Mbps=0.9 MHz (88% of the C/A modulation rate), it follows that the noise level within the signal bandwidth of the C/A-code signal is $$N_{c/a} = -144.4 \text{ dBw} = -114.4 \text{ dBm.} \qquad (2)$$

Because the minimum requested bandwidth for the GPS P code is >0.88×10.23 Mbps=9 MHz (88% of the P modulation rate), it also follows that the noise level within the signal bandwidth of the P-code signal is given by $$N_p = -134.4 \text{ dBw} = -104.4 \text{ dBm.} \qquad (3)$$

For an exemplary L1/L2 GPS antenna with a 20 MHz bandwidth, the noise floor in (1) then becomes $$N_a = -131 \text{ dBw} = -101 \text{ dBm.} \qquad (4)$$

On the other hand, GPS signal levels at the Earth's surface are ~135 dBm so that GPS signals are ~30 dB below system noise levels and thus, any signals above thermal noise may be considered to be deliberate or inadvertent interference.

The invention therefore recognizes that beam tracking of GPS satellite signals is not necessary because of GPS satellite redundancy and the fact that all GPS receivers are capable of automatically selecting 3 or 4 in-view satellites based on received signal strength and PDOP. Accordingly, the adaptive nulling methods of the invention can be directed to a simple minimization of the antenna array output power.

GPS adaptive nulling processes preferably find an optimal weight vector (typically called the Wiener Weight Vector) $W_{opt} = R^{-1}\rho$ in which $R^{-1}$ is the inversion of an (n×n) auto and cross-correlation matrix between auxiliary antenna elements, and $\rho$ represents the n cross-correlations between a reference antenna element and the auxiliary elements (n is the total number of elements in the antenna array).

The invention recognizes that this indicates a substantial computational effort (especially as the number n increases) and, accordingly, the methods of the invention are based on the orthogonal expansion of an optimal weight vector in an orthonormal vector base. The uncoupled nature of orthonormal vectors simplifies computation efforts (e.g., correlation computation and gradient estimation are avoided) and facilitates the use of inexpensive GPS arrays (e.g., as shown in FIG. 8).

In a multiple interference environment, the optimal weights of an array can be decomposed into a combination of interference directional vectors $I(\theta_k)$ that generate an antenna null along the direction of each interference source. Mathematically, this is expressed by $$w_{opt} = \Sigma \gamma_k I(\theta_k) \quad (5)$$

in which $\gamma_k$ represents the vector coefficients. The adaptive nulling process has a goal of finding a minimum output power $$Y = W^T X = (c_1^* e_1 + c_2^* e_2 + \ldots c_n^* e_n)^T X \quad (6)$$

in which T is the transpose operator, * is the conjugate operator and the basis vectors $e_n$ are orthornormal (i.e., their dot product $<e_i, e_j> = 1$ for i=j and =0 for i≠j). Because the orthornormal basis vectors are uncoupled, the series (6) converges to $w_{opt}$ with a minimum of iterative steps.

In contrast to conventional perturbation methods in which one element weight is changed at a time, the invention updates all array weights simultaneously. In the invention's methods, time-consuming gradient or correlation matrix computations are not required nor is prior knowledge of the interference signal structure required, and a coefficient search method rapidly achieves the point of minimum power (as measured, for example, by the power monitor 99 in FIG. 3).

Figure 9:
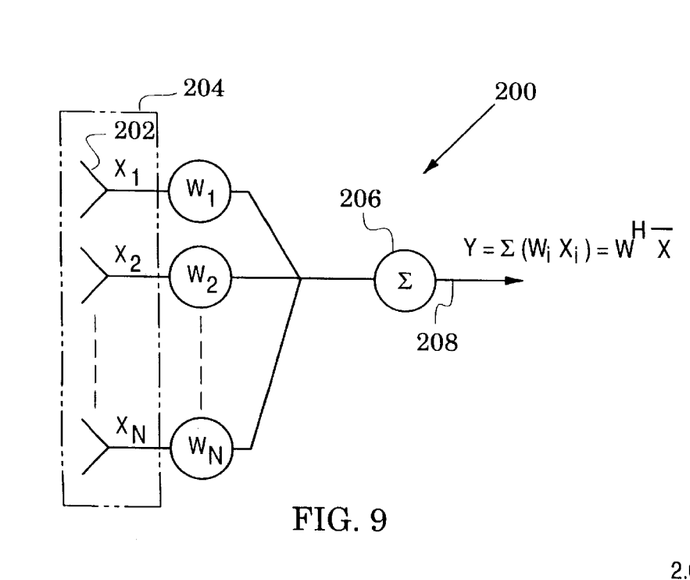
FIG. 9 is a mathematical model that illustrates weighting of signals in a single-port GPS receiving structure.

FIG. 9 is a mathematical model 200 for realizing the output power of equation (6). In the model, signals $X_i$ from elements 202 of an antenna array 204 are modified by weights $W_i$ and are summed in a summer 206 to generate (at a single output port 208) an output power signal $$Y = \Sigma(W_i X_i) = W^H X \quad (7)$$

in which H is the Hermitian operator.

Figure 10:
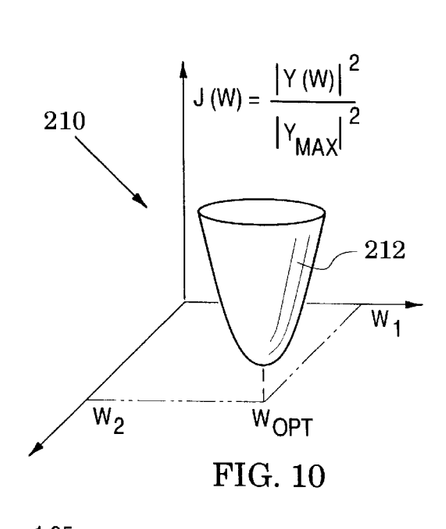
FIG. 10 is a graph of a bowl-shaped surface which represents combined output power in the model of FIG. 9.

FIG. 10 is a graph 210 whose vertical direction is normalized power J(w) and which indicates a bowl-shaped surface 212 that represents output power of the model of FIG. 9 for a two-element array. The optimal weight corresponds to the weight vector $\{w_1, w_2\}$ at the bottom of the bowl and further corresponds to the minimum output power of a GPS array (e.g., at the output port 208 in FIG. 9).

The invention's processes are directed to the orthogonal projection of a weight vector in n-dimensional vector space, i.e., the representation of weights as a series of an orthogonal expansion. Such a series allows the weight setting to be represented as a point in vector space (referred to as a weight space) so that the adaptive weights may be viewed in a geometrical context as exemplified by the graph 220 of FIG. 11.

Figure 11:
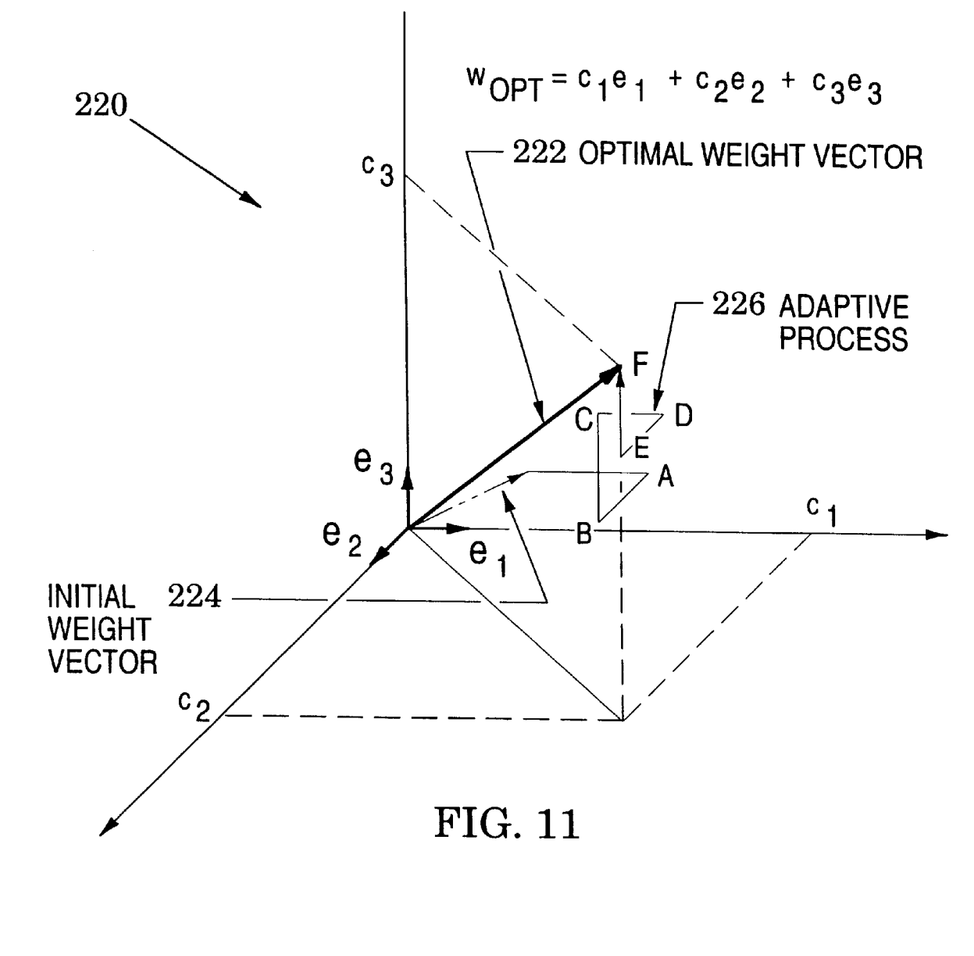
FIG. 11 is a diagram that illustrates an adaptive process for reducing the distance between an optimal weight and an adaptive weight in an orthonormal weight vector space.

This figure shows a 3-dimensional weight vector space and facilitates the visualization of, a) an orthonormal weight vector space, b) optimal-weight coefficients $c_1$, $c_2$ and $c_3$ in that vector space, c) a distance between an optimal weight 222 and an adaptive weight 224, and d) the minimization of that distance through an adaptive process 226.

Vector analysis teaches that any weight vector in a 3-dimensional space can be expressed by three vectors that do not all lie in same plane and are not collinear. Such vectors are said to be linearly independent, said to span the 3-dimensional vector space and are collectively referred to as a basis-vector set. In a special case, the vectors are called an orthonormal basis set $e_i$, $e_j$ ... $e_n$ if they have unit magnitude and $$e_i^T e_j = \delta_{ij} = 0 \text{ when } i \neq j \text{ and} = 1 \text{ when } i = j \quad (8)$$

wherein $\delta_{ij}$ is the Kioveckev Delta. By generalizing these concepts to an adaptive nulling process, the optimal weight can be expressed in terms of a set of orthonormal basis vectors as follows:

$$w_{opt} = c_1 e_1 + c_2 e_2 + \ldots c_n e_n. \quad (9)$$

FIG. 11 shows such a vector weight space for the case of n=3. By means of such a weight space, one can alternatively represent the optimal weight setting of all array elements as a point with n-dimensional coordinates $c_1, c_2 \ldots c_n$ in which n is the weight space dimension (not the number of array elements). Because of the uncoupled nature of the orthonormal vectors $e_1, e_2 \ldots e_n$, the work of matrix computation is reduced and rapid convergence to the optimal weight vector (equation (9)) is obtained.

Any weight vector w(k, l) can thus be expressed in term of a complete orthonormal basis vector set $\{e_i (k, l)\}$ as a series $$w(k, l) = A e^{j\alpha(k, l)} = \Sigma c_i e_i(k, l) \quad (10)$$

in which the coefficient $c_i$ is the projection of w onto basis vectors $e_i$, k=1, 2 ... K denotes the radial elements and l=1, 2 ... L denotes the azimuth elements. Adaptive processes of the invention generate a linear combination of orthonormal basis vectors $$\omega(k) = w_k + \Sigma c_i^* e_i \quad (11)$$

and the process of adjusting coefficients $\{c_i^*\}$ obtains $$\xi^2 = \|W_{opt} - w(k)\|^2 \quad (12)$$

wherein the error $\xi^2$ corresponds to the output power from the single port receiver structure (e.g., 124 of FIG. 4) and the error $\xi^2$ can be minimized by adjusting the value of coefficients $\{c_i^*\}$. The progressive approach of the weight w(k) to $w_{opt}$ is shown in steps A, B, C ... F of the process 226 of FIG. 12.

Attention is now directed to the construction of an orthonormal vector basis $\{e_i\}$ in a circular array. Based on the property of orthogonal matrices, the product of two orthogonal matrices is a new orthogonal matrix so that the orthogonal weight space E for a 2-dimensional planar circular array (e.g., as shown in FIG. 5) can be generated from the product of a 1-dimensional radial orthonormal basis $\rho$ and a 1-dimensional azimuthal basis $\Phi$, i.e., $E = \rho\Phi$.

A number of complete functions (e.g., Harr functions, Bessell functions and Legendre polynomials) can be selected for a radial basis and other complete functions (e.g., the circular function, Chebyshev polynomials and Wavelet orthonormal basis) can be selected for the azimuthal basis. At each step of the invention's processes, it is insured that the relationships of equation (8) are satisfied.

Figure 12A:
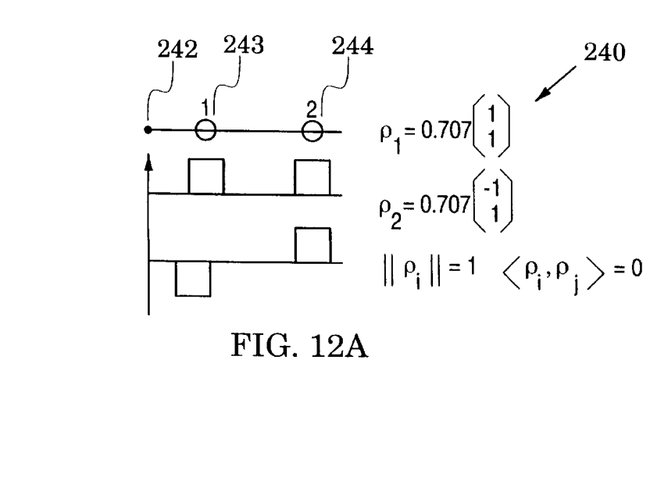
FIGS. 12A and 12B respectively illustrate an exemplary 1-dimensional radial orthonormal basis and an exemplary 1-dimensional azimuthal orthonormal basis.
Figure 12B:
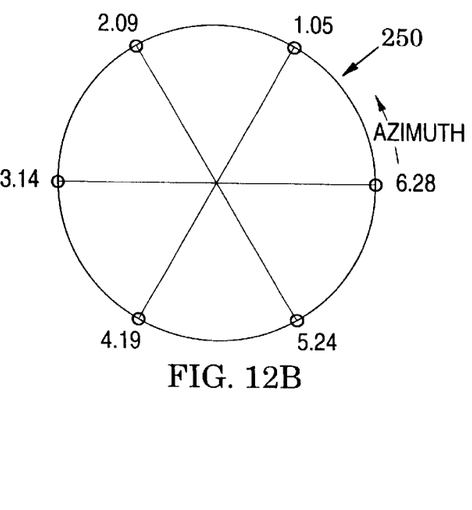

Examples of a 1-dimensional radial orthonormal basis and a 1-dimensional azimuthal orthonormal basis are respectively shown in the graphs 240 and 250 of FIGS. 12A and 12B. The array center and radial basis vectors $\rho_1$ and $\rho_1$ are respectively referenced as 242, 243 and 244 in FIG. 12A.

The azimuthal basis vectors of FIG. 12B are given by:

$\Phi_1 = \{0.5\ 0.5\ 0.0\ -0.5\ -0.5\ 0.0\}^T$
$\Phi_2 = \{0.289\ -0.289\ -0.577\ -0.289\ 0.289\ -0.577\}^T$
$\Phi_3 = \{0.5\ 0.5\ 0.0\ 0.5\ 0.5\ 0.0\}^T$
$\Phi_4 = \{0.0\ 0.0\ 0.707\ 0.0\ 0.0\ 0.707\}^T$
$\Phi_5 = \{-0.453\ 0.453\ -0.406\ 0.36\ -0.36\ 0.406\}^T$
$\Phi_6 = \{0.46\ -0.46\ -0.038\ 0.536\ -0.536\ 0.038\}^T$ wherein the norm of $\Phi_i$ is $\|\Phi_i\|^2=1$ and $<\Phi_i,\Phi_j>=0$. A 2-dimensional orthonormal basis $e_{ij}$ for a circular array with 13 elements has been computed as the product of the radial and azimuthal basis vectors and is shown in the equations 260 of FIG. 13.

Figure 14:
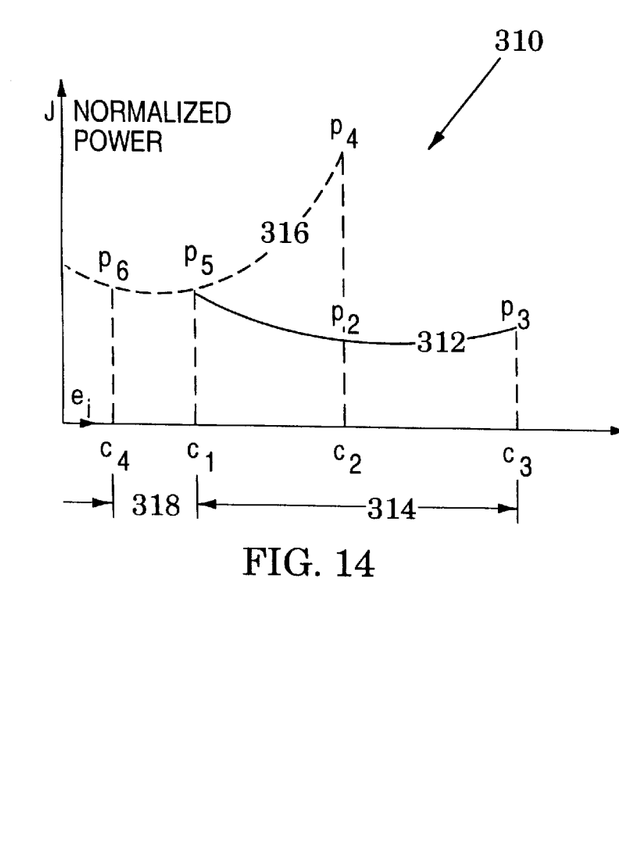
FIGS. 14 and 15 are graphs of combined array power as a function of an exemplary basis vector of FIG. 11.
Figure 15:
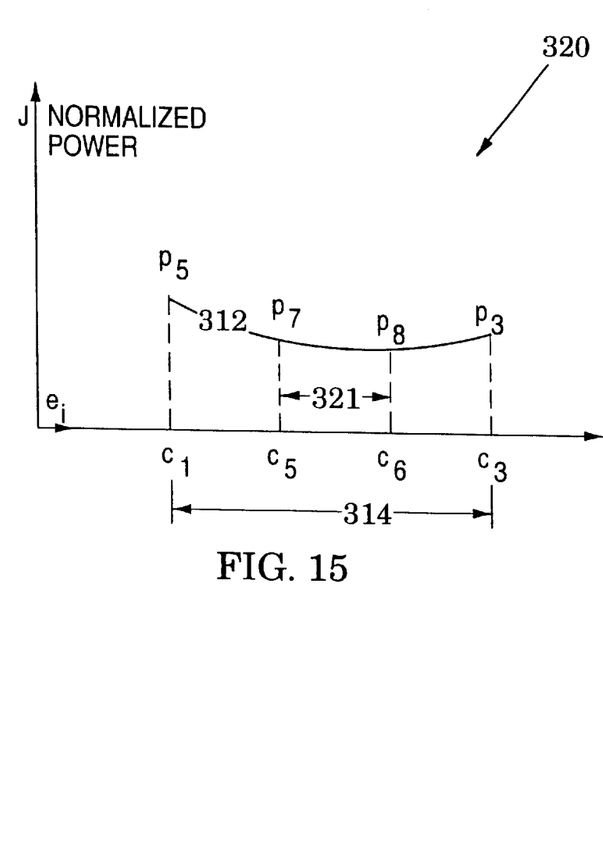

When seeking a process for finding the projection $\{c_i^*\}$, the required number of basis vectors in a weight space can be reduced by beam space decomposition, which is related to the number of interference sources that are to be suppressed. FIGS. 11, 14 and 15 illustrate the following steps for seeking the optimal coefficient $c_i^*$:

a) assuming an initial weight setting (224 in FIG. 11), b) selecting a basis vector $e_i$ from the orthonormal weight basis, c) finding the projection $c_i^*$ by establishing a range of $c_i$ where the projection may be located (e.g., see FIG. 14), d) resolving the value of $c_i^*$ by using a fast searching process for finding the minimum of the output power in the range found in c) above (e.g., see FIG. 15), e) updating the weight vector as $$\omega'_{m+1}(k,l) = \omega_m(k,l) + c^* e_i(k,l) \quad (13)$$

wherein for the case of phase-only weighting, the phase shifter value $\alpha(k,l)$ is updated for the k, l element ($k^{th}$ in radial, $l^{th}$ in azimuth) by $$\alpha'(k,l) = \alpha(k,l) + c^* e_i(k,l) \text{ (radians)} \quad (14)$$

or $$\alpha'(r,s) = \{\alpha(k,l) + c^* e_i(k,l)\} \times 57.30 \text{ (degrees)}, \quad (15)$$

f) replacing the $w_{kl}$ vector with the new phase-weight-vector $w_{kl'}$, and g) finding the next projection $c_{i+1}^*$ on the basis vector $e_{i+1}$.

The adaptive process continues as shown at A, B, C . . . F in FIG. 11. When the phase-weight vector approaches to the optimal value set, the interference power output declines toward the noise floor. When the phase adjustments have reduced the power of the combined signal below the a selected threshold level, the adaptive process is terminated. Computer simulations have indicated that the adaptive process typically requires less than 50 iterations for reaching a null depth of −40 dB.

Figure 16:
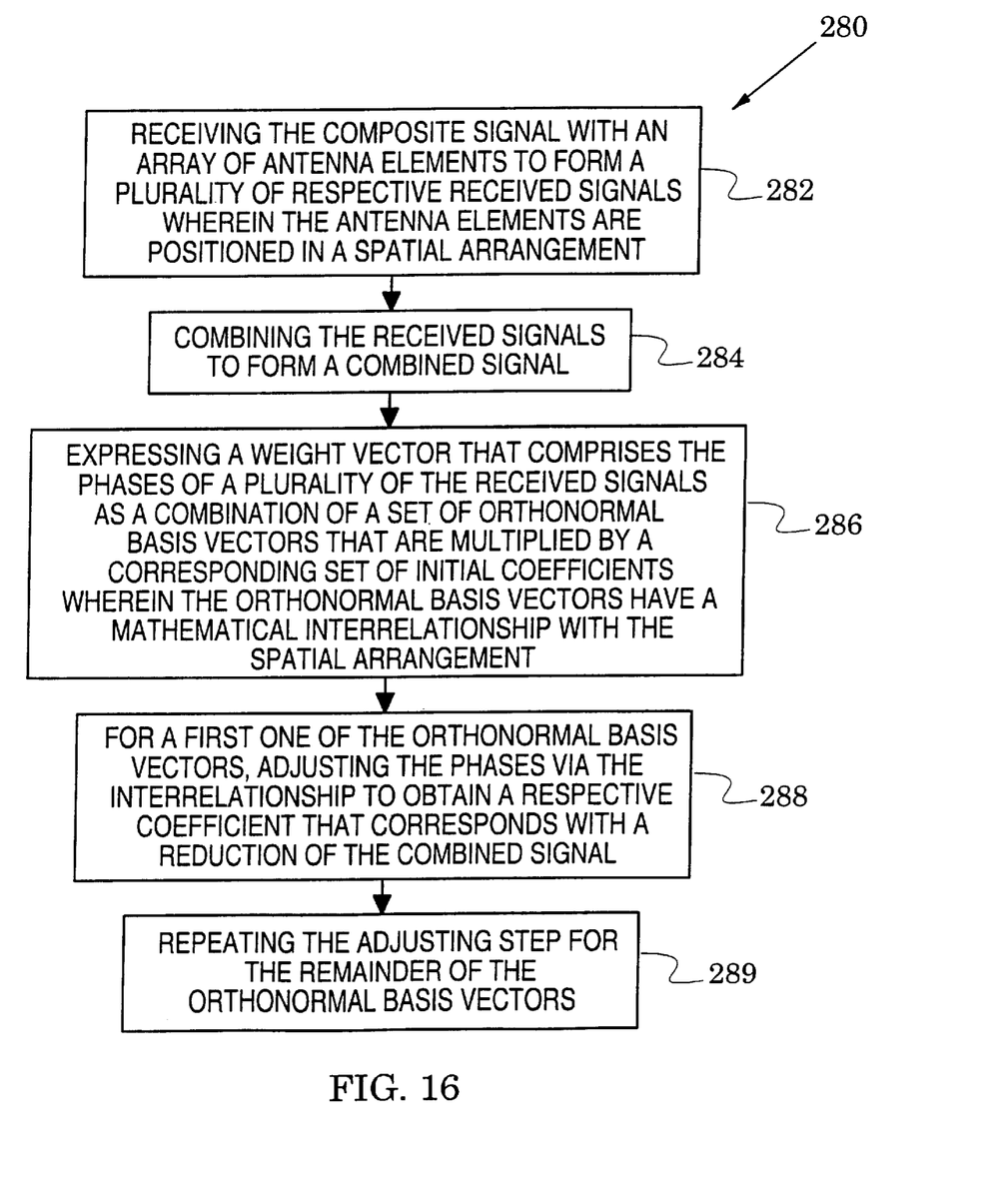
FIG. 16 is a flow chart that describes processes of the invention.

The flow chart 280 of FIG. 16 describes processes of the invention for reducing the contribution of at least one interference signal to a composite signal that includes the interference signal and at least one GPS signal wherein each interference signal propagates along an associated signal path.

In a first process 282, the composite signal is received with an array of antenna elements (e.g., 130 in FIG. 4) to form a plurality of respective received signals wherein the antenna elements are positioned in a known spatial arrangement (e.g., as in FIGS. 5–8). The received signals are then combined to form a combined signal in step 284 (e.g., in the power combiner 140 of FIG. 4)

In process step 286, a weight vector that comprises the phases of a plurality of the received signals is expressed as a combination of a set of orthonormal basis vectors that are multiplied by a corresponding set of initial coefficients (e.g., as in equation (10) above) wherein the orthonormal basis vectors have a mathematical interrelationship with the array's spatial arrangement (e.g., as in FIGS. 12A, 12B and 13).

In process step 288, a first one of the orthonormal basis vectors is adjusted via the interrelationship to obtain a respective coefficient that corresponds with a reduction of the combined signal. This process is exemplified in FIGS. 14 and 15. Finally, the adjusting step 288 is repeated in step 289 for the remainder of the orthonormal basis vectors.

The contribution of the interference signal is reduced by the reduction of the combined signal because of the known spatial relationship between the signal path and the spatial arrangement of the array. In the array 190 of FIG. 8, for example, received signals from the auxiliary elements 192 will have a phase shift relative to the received signal from the reference element 191 that is a function of the interference signal's path and the spatial arrangement of the array 190.

Proper phase adjustment of the auxiliary received signals will cause them to subtract from the reference received signal. Complete cancellation (i.e., nulling) of the reference signal to effect a nulling of the combined signal can be obtained by also applying amplitude weights. In the array 190, for example, the amplitude of each auxiliary signal can be adjusted in low noise amplifiers to be ⅓ that of the reference signal. Because of the spread spectrum nature of the GPS signals, it is known that any reduction of output power (e.g., from the power combiner 140 of FIG. 4) is a reduction of the interference signal.

In the processes of the flow chart 280, the reduction of the combined signal is hastened by the uncoupled nature of the orthonormal basis vectors. This can be appreciated from a consideration of the flow charts 290 and 300 of FIGS. 17 and 18 as they relate to FIGS. 14 and 15 which both illustrate normalized power (e.g., from the power combiner 140 of FIG. 4) as a function of any one of the orthornormal vectors $e_i$ of FIG. 11 and coefficients of that vector.

Figure 17:
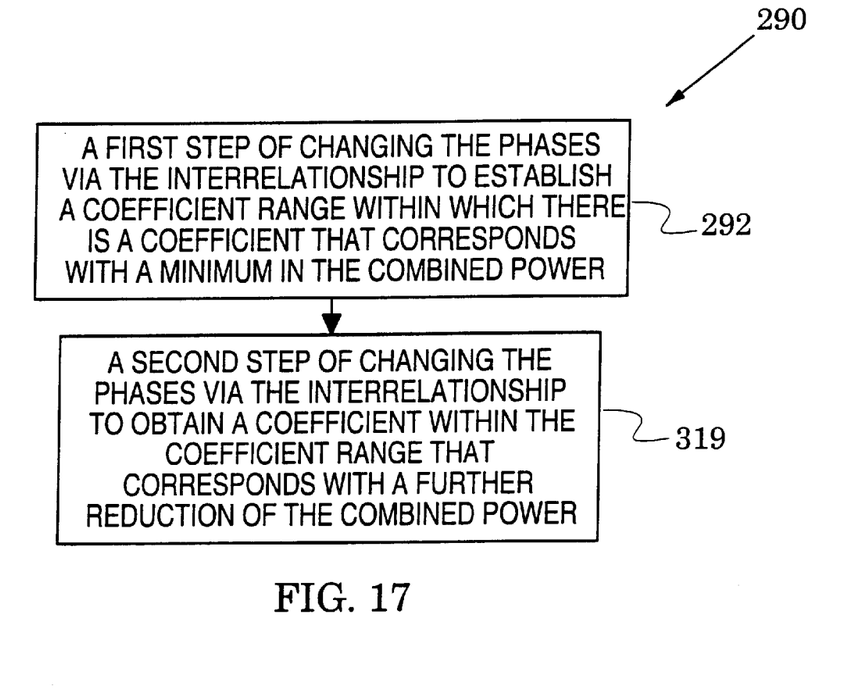
FIGS. 17 and 18 are flow charts that describe further processes of the invention as exemplified in FIGS. 14 and 15.

In a first process step 292 of FIG. 17, the signal phases are changed via the interrelationship (between the orthonormal basis vectors and the array's spatial arrangement) to establish a coefficient range within which there is a coefficient that corresponds with a minimum in the combined power.

This process is exemplified in the graph 310 of FIG. 14 where a first coefficient $c_1$ corresponds to an output power $p_1$ and a subsequent increased coefficient $c_2$ corresponds to a reduced output power $p_2$. This reduction indicates that the coefficient should be farther increased to a coefficient $c_3$. Because the coefficient $c_3$ corresponds to an increased output power $p_3$, the output power can be assumed to have a saddle shape 312 between $c_1$ and $c_3$ and a coefficient range 314 is thereby established within which a coefficient can be found that corresponds to a minimum in the output power.

However, if the output power has the shape 316, then the coefficient $c_2$ corresponds to an increased output power $p_4$. This power increase indicates that the coefficient should instead be decreased to a coefficient $c_4$. Because the coefficient $c_4$ corresponds to an increased output power $p_6$, a coefficient range 318 is established within which a coefficient can be found that corresponds to a minimum in the output power.

In a second process step 319 of FIG. 14, the signal phases are changed via the interrelationship to obtain a coefficient within the coefficient range that corresponds with a further reduction of the combined power. This latter process is exemplified in the graph 320 of FIG. 15 where it is assumed that the range 314 of FIG. 14 has been established. Signal phases are now changed via the interrelationship to obtain coefficients $c_5$ and $c_6$ that span the range 314. These coefficients correspond to output powers $p_7$ and $p_8$. The process can be terminated at this point with the lowest obtained power $p_8$ or iterated to further approach the minimum power point $p_{min}$. For example, it is now known that the minimum is in a range 321 between $c_5$ and $c_6$. This range can be spanned in a manner similar to that used for the range 314 to find coefficients corresponding to further decrease of the combined power.

It was seen in graph 310 of FIG. 14 that increases and decreases of output power indicated whether the respective coefficient should be increased or decreased in a subsequent phase change. This is summarized in process step 324 of flow chart 300 of FIG. 18 in which the phases are changed via the interrelationship to increase the respective coefficient if a prior increase obtained a reduction of the combined signal and to decrease the respective coefficient otherwise. In the opposite process step 326, the phases are changed via the interrelationship to decrease the respective coefficient if a prior decrease obtained a reduction of the combined signal and to increase the respective coefficient otherwise.

It may further hasten the process if the magnitude of each coefficient change is conditioned by the magnitude of the change in the combined signal that was effected in the prior coefficient change. In this method variation, a current coefficient change would be increased if the last coefficient change effected a large change in the combined signal and would be decreased if the last coefficient change effected a small change in the combined signal.

Figure 18:
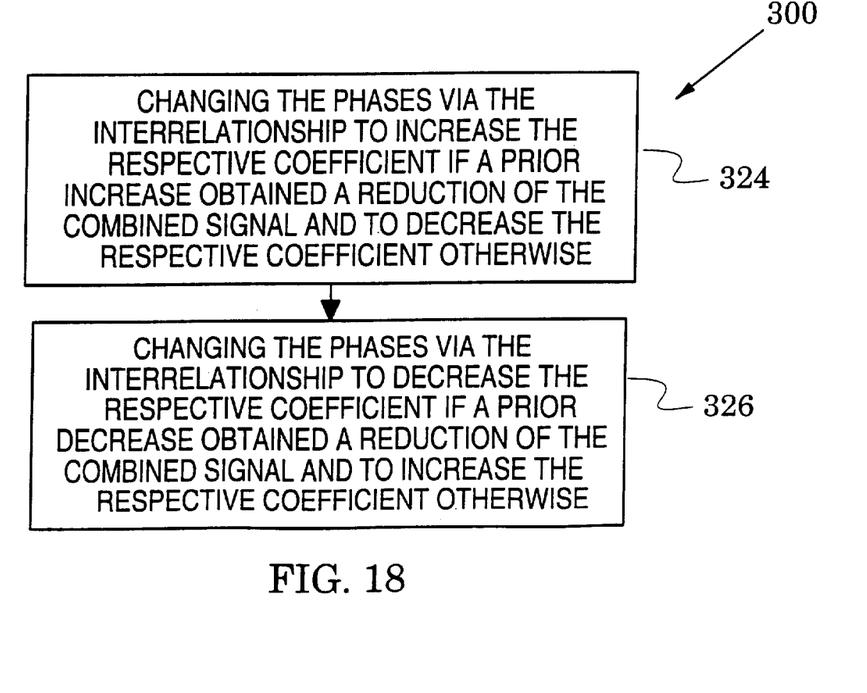

Because of the uncoupled nature of the orthonormal basis vectors, the processes of FIGS. 16–18 can be carried out in various orders. For example, the methods exemplified in FIGS. 14 and 15 can be continued until a final value is determined for a first coefficient after which this process is repeated for each subsequent coefficient $c_i$. Alternatively, the invention's processes can be used to determine interim values for each coefficient as exemplified by steps A, B and C in FIG. 11 after which the processes are iterated as exemplified by steps D, E and F in FIG. 11 to determine more accurate coefficients.

Adaptive nulling methods of the invention have been shown to efficiently generate interference nulls while facilitating the use of simple single-port antennas. For example, the methods of the invention have been simulated with an exemplary four-element antenna design and they have also been tested with an exemplary four-element antenna prototype in an anechoic chamber.

Figure 19:
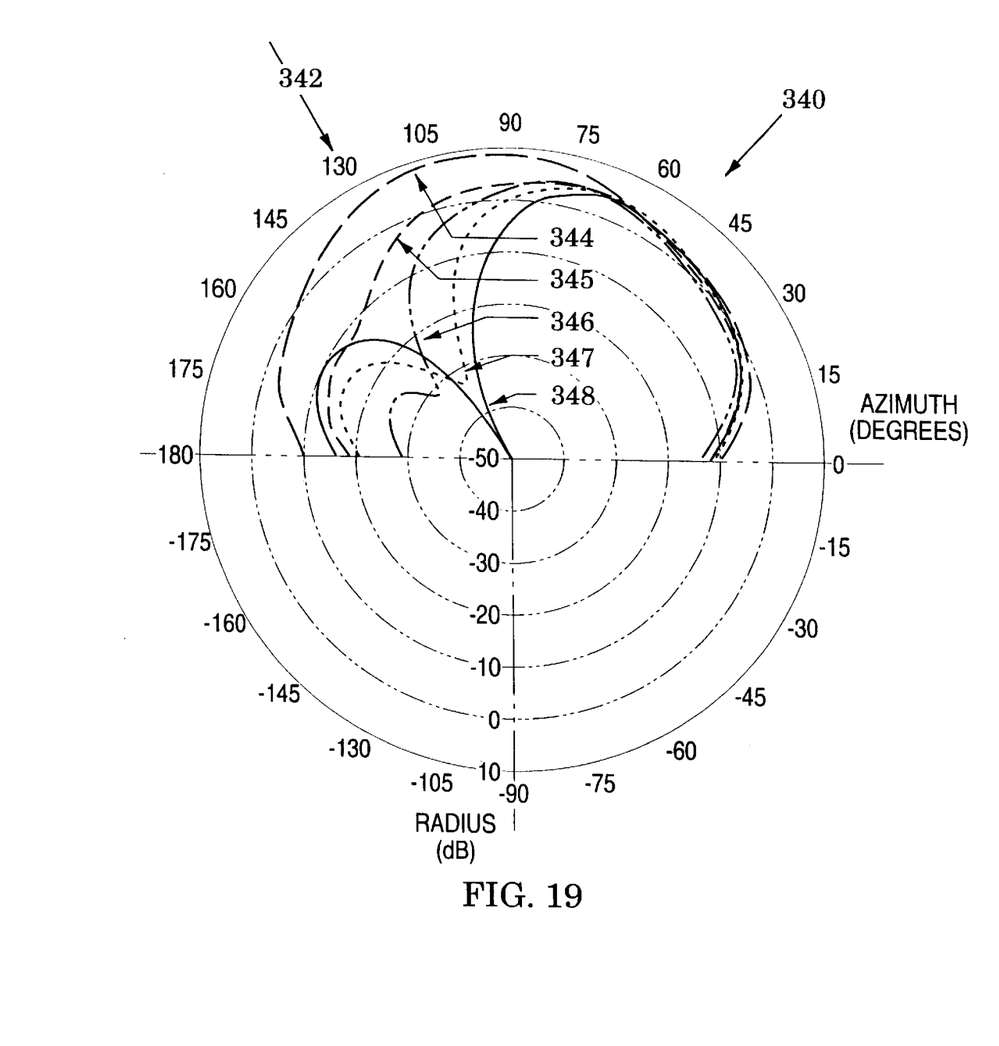
FIG. 19 is an azimuth-plane radiation pattern that shows the forming of an interference null with successive iterations in a simulation of the adaptive methods of the invention.

The simulation was based upon an antenna array with a substantially hemispherical gain pattern and it was assumed that an interference source in the L1 frequency band was positioned at 50° elevation and 90° azimuth. The graph 340 of FIG. 19 is a elevational slice taken along the 90° azimuth plane. Accordingly, the interference signal is arriving along the radial arrow 342 at 50° elevation (in FIG. 19, 180° represents the horizon so that a 50° elevation is indicated at a graph angle of 130°). FIG. 19 shows that the adaptive methods of the invention adjusted the antenna pattern to have successive patterns 344, 345, 346, 347 and 348. The initial pattern 344 approximates a hemisphere and each successive pattern had a deeper notch with the final pattern 348 having a notch directed at the source with a depth of ~50 dB.

Figure 20:
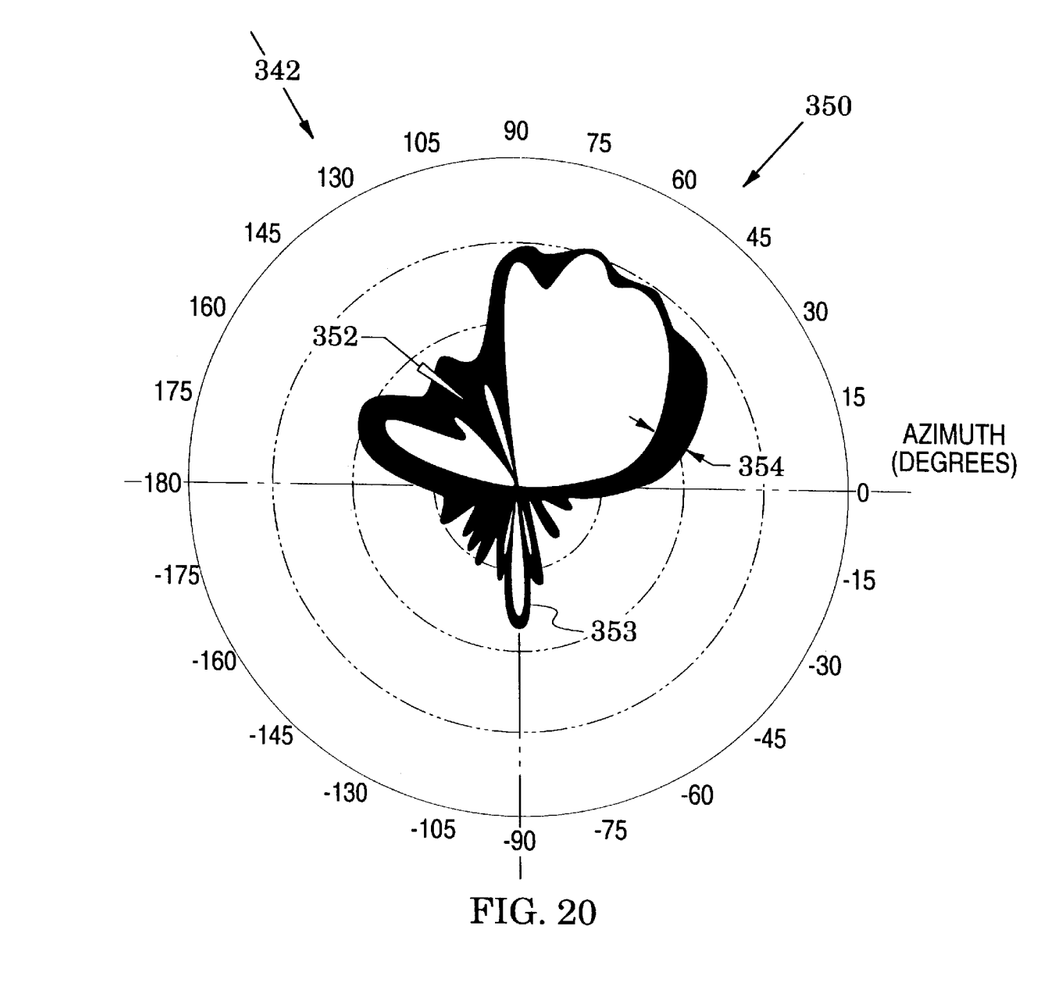
FIG. 20 is an azimuth-plane radiation pattern measured in an anechoic chamber with the methods of the invention applied to an exemplary four-element antenna array prototype.

The graph 350 of FIG. 20 relates to the anechoic chamber test of an exemplary four-element antenna prototype and is also an elevational slice taken along the 90° azimuth plane of the antenna pattern. The interference signal is again indicated by the radial arrow 342 at 130° elevation (i.e., 90° above the 180° level of the earth). This pattern was generated with an 1575 MHz signal (a signal at the L1 frequency) and illustrates that the adaptive methods of the invention generated a notch 352 with a depth of ~40 dB in the interference direction. The antenna also generated back lobes generally indicated as lobes 353. Pattern distance from the chart center indicates relative signal strength (in dB) and pattern width 354 indicates relative rejection of counter-clockwise radiation.

Adaptive nulling methods have been described which avoid time-consuming gradient or correlation matrix computations. The methods do not require prior knowledge of interference signal structure and, because of the uncoupled nature of their orthogonal basis vectors, they facilitate the simultaneous updating of all array weights and rapidly converge to an optimal weight setting.

The preferred embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A single-port weighting system for applying phase and/or amplitude weights to received microwave signals, comprising:
    an array of antenna elements;
    a microwave power combiner;
    a plurality of I/Q weighting circuits that each directly connects a respective one of said antenna elements to said power combiner and includes:
        a) one of a hybrid coupler and a summer connected to that circuit's respective antenna element;
        b) the other of said hybrid coupler and said summer connected to said power combiner;
        c) a first microwave mixer coupled between a first port of said hybrid coupler and a first port of said microwave summer; and
        d) a second microwave mixer coupled between a second port of said hybrid coupler and a second port of said microwave summer;
        wherein said first and second mixers have input ports for application of said weights;
    and
    a single microwave downconverter coupled to said power combiner and having a single output port for access to said received signals.

2. The system of claim 1, wherein said hybrid coupler is a 90 degree hybrid coupler.

3. The system of claim 1, further including an analog-to-digital converter coupled to said single output port for conversion of said received signals to digital format.

4. A single-port weighting system for applying phase and/or amplitude weights to received microwave signals, comprising:
    an array of antenna elements;
    a microwave power combiner;
    a plurality of microwave structures that each:
        a) couple first and second signal paths between a respective one of said antenna elements and said power combiner;

b) have first and second mixers respectively in said first and second signal paths wherein said first and second mixers each have an input port for application of said weights; and c) insert a phase shift structure in one of said first and second signal paths;

and a single microwave downconverter coupled to said power combiner and having a single output port for access to said received signals.

5. The system of claim 4, wherein said first and second signal paths include a hybrid coupler at one end of said paths and a summer at another end of said paths.

6. The system of claim 4, wherein said phase shift structure comprises a hybrid coupler.

7. The system of claim 4, further including an analog-to-digital converter coupled to said single output port for conversion of said received signals to digital format.

* * * * *